United States Patent [19]

Renth

[11] Patent Number: 4,688,349

[45] Date of Patent: Aug. 25, 1987

[54] APPARATUS FOR INSECTICIDE APPLICATION

[76] Inventor: Lawrence B. Renth, 4825 N.W. 75th St., Oklahoma City, Okla. 73132

[21] Appl. No.: 782,094

[22] Filed: Sep. 30, 1985

[51] Int. Cl.$^4$ .............................................. A01M 1/20
[52] U.S. Cl. .................................. 43/132.1; 43/124; 52/743
[58] Field of Search ............... 43/124, 129, 131, 132.1; 52/101, 443, 517, 743; 239/143

[56] References Cited

U.S. PATENT DOCUMENTS

| | | | |
|---|---|---|---|
| 1,728,837 | 9/1929 | Slayter | 52/743 |
| 2,235,542 | 3/1941 | Wenzel | 52/743 |
| 2,842,892 | 7/1958 | Alridge et al. | 43/124 |
| 2,899,771 | 8/1959 | Burris, Jr. | 43/124 |
| 2,952,938 | 9/1960 | Abrams | 43/131 |
| 3,285,810 | 11/1966 | Hart | 52/101 |
| 3,358,059 | 12/1967 | Snyder | 52/743 |
| 3,473,252 | 10/1969 | Kramer et al. | 43/124 |
| 3,816,610 | 6/1974 | Lusby | |
| 4,127,618 | 12/1979 | Felter | 52/743 |
| 4,134,242 | 1/1979 | Musz et al. | 52/743 |
| 4,222,935 | 6/1981 | Lukas et al. | 52/743 |
| 4,553,698 | 11/1985 | Parker et al. | 239/143 |

FOREIGN PATENT DOCUMENTS

| | | | |
|---|---|---|---|
| 213585 | 9/1984 | Denmark | 43/124 |
| 1531276 | 11/1978 | United Kingdom | 52/517 |

*Primary Examiner*—M. Jordan
*Attorney, Agent, or Firm*—Laney, Dougherty, Hessin & Beavers

[57] ABSTRACT

A method and apparatus for application of insecticide throughout a building structure by mixing metered amounts of insecticide with bulk insulation undergoing pneumatic placement. A bulk insulation pneumatic applicator apparatus is used in combination with a metering device that feeds insecticide into the applicator for mixture and placement with the bulk insulation.

4 Claims, 2 Drawing Figures

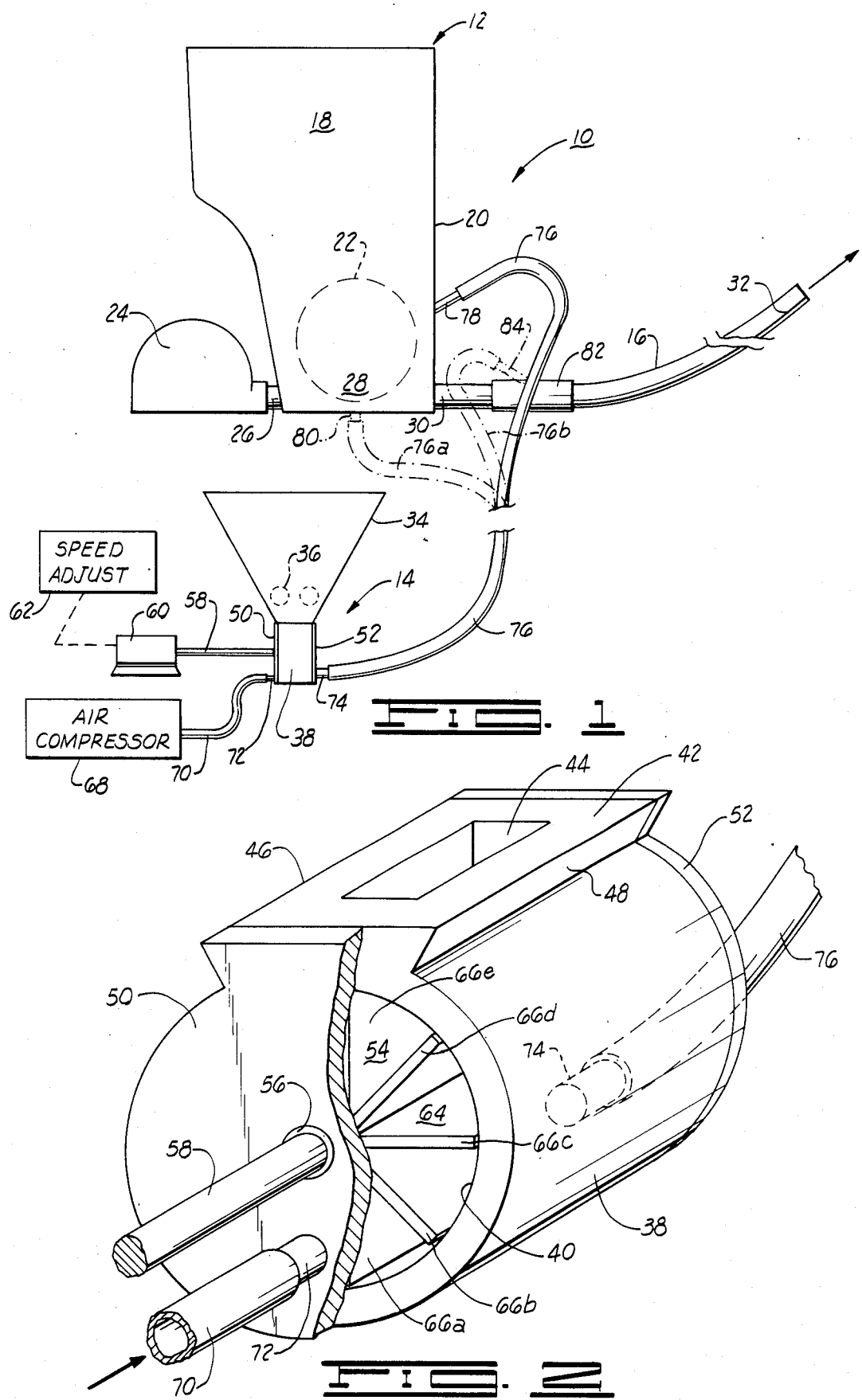

APPARATUS FOR INSECTICIDE APPLICATION

BACKGROUND OF THE INVENTION

1. Field of the Invention

The present invention relates to the distributive application of insecticide throughout a building structure and more particularly, but not by way of limitation, a method and apparatus for distributing insecticide in combination with bulk insulation throughout a building structure either during initial construction or during supplemental insulation application.

2. Description of the Prior Art

The prior methods of applying insecticides or the like throughout building structures have adhered to generally standardized procedures wherein the insecticide material is singularly deposited. Termite protection has required earth/structure barrier establishment using selected pesticides and this practice has been generally static although there have been more specialized developments as might be exemplified by U.S. Pat. Nos. 2,842,892; 2,899,771; and, 2,952,938.

The remainder of the general class of building structure pests has been variously combatted by spraying or dusting with specific insecticides, rodenticides or the like. U.S. Pat. Nos. 3,473,252 and 3,816,610 are directed to a combination approach wherein a rodenticide is combined with a foaming plastic and the material is sprayed into den structures to achieve both a poisoning and a plugging or smothering effect. In general, prior insecticide spraying or dusting techniques consist of periodic application throughout a building structure, applying the pesticide substance as well as possible to all of the nooks, crannies and nesting places.

SUMMARY OF THE INVENTION

The present invention is a method and apparatus for applying selected insecticide or pesticides to the interior of a building structure simultaneously with the application of bulk insulation material throughout the intrastructural voids and surfaces. The apparatus utilizes the bulk insulation comminutor and blower for impelling bulk insulation through an application hose up within the confines of a building structure, and the structure further includes an additional metering means for applying a selected pesticide under sufficient air pressure for input into the main flow of the bulk insulation. The combined material is then distributed through the insulation applicator line as directed into the building structure interior. The combination application method and apparatus is particularly suited for placement of anti-roach materials such as blatticide powders in sufficient volume and distribution within a structure thereby to effect very long term protection.

Therefore, it is an object of the present invention to provide an effective means for enabling a long term protection against pests and insects within a building.

It is also an object of the invention to provide a mode of dust pesticide application that enables more thorough and reliable protection.

It is still further an object of the present invention to provide a method of pesticide application that places insecticidal material more evenly throughout all confines of the intra-structural spaces of the building.

It is another object of the present invention to provide permanent installation and placement of bulk insulation containing insecticide within a building structure.

Finally, it is an object of the present invention to apply more economically a blatticide throughout a building structure with the capability of providing freedom from roaches for a very long duration.

Other objects and advantages of the invention will be evident from the following detailed description when read in conjunction with the accompanying drawings which illustrate the invention.

BRIEF DESCRIPTION OF THE DRAWINGS

FIG. 1 is an idealized view in elevation of insulation-/insecticide applicator apparatus constructed in accordance with the present invention; and FIG. 2 is an enlarged perspective view of a metering device as used in the invention with parts shown in cutaway.

DETAILED DESCRIPTION OF THE INVENTION

FIG. 1 illustrates a combination apparatus 10 that is suitble for simultaneous deposition of bulk insulation and pesticide in accordance with the method of the present invention. Apparatus 10 consists of a bulk insulation dispenser 12 and a pesticide metering device 14 which function to provide a comminuted mixture of bulk insulation and dust-form pesticide for transfer along a hose 16 to an applicator operator disposed up within a building structure. Any of various commercially available types of bulk insulation of the types susceptible of blower placement may be utilized, and any of a number of selected insecticides may be input through metering device 14 although the method has shown particular adaptation for dusting of boric acid as employed for cockroach extermination, i.e. a blatticide.

The dispenser 12 may consist of a generally rectangular hopper 18 suitable for receiving and holding a relatively large quantity of bulk insulation, e.g. rock wool or the similar types. The hopper 18 terminates at the lower extremities in a relatively narrower portion 20 which also includes a motor-driven rotary comminutor 22 of well-known type. A suitable type of dispenser 12 may be such as the Hoshall-type Tiger II Model. commercially available from Industrial Gasket Inc. of Oklahoma City, Okla. A suitable vari-speed centrifugal blower 24 may be disposed to provide air flow via input conduit 26 to one side of the bottom extremity 20 of the dispenser 12 to move air under high pressure across the bottom portion 28 to force comminuted bulk insulation out through output conduit 30 for conduction up along the applicator hose 16, the output end 32 being under an operator's direction and control within a building structure.

The metering device 14 consists of a hopper 34 and suitable agitating elements 36 providing input of dust insecticide downward into a meter housing 38. See also FIG. 2, as meter housing 38 consists of a cylinder defining an interior bore 40 and upwardly disposed rectangular collar 42 defining a drop slot 44 through to the interior of housing 38. The collar 42 is adapted with angularly oriented side walls 46 and 48 in order to provide a dust-tight clamp fit to the associated hopper 34. Suitably formed end plates 50 and 52 are adapted to be sealingly secured over the ends of cylindrical housing 38 thereby to complete confinement of a metering chamber 54.

The end plate 50 is formed with a central journal 56 which receives a shaft 58 rotatably therethrough, shaft 58 being controllably rotatable by means of a motor 60

(see FIG. 1) under control of speed adjust circuit 62. The rotary shaft 58 is connected to drive a paddle-type metering wheel 64 as closely received within inner bore 40 of cylinder housing 38, the metering wheel 64 consisting of a plurality of equi-angularly spaced radial vanes 66*a*–66*n*. The number and angular spacing of vanes 66 will depend on the desired rate of metered dust ejection relative to the range of rotary speeds of shaft 58.

Dust insecticide is picked up for ejection from within chamber 54 by air under pressure from an air compressor 68 (FIG. 1) via conduit 70 and input tube 72 through end plate 50. Exiting dust from the metered portion or segment of chamber 54 flows through an exit tube 74 disposed through end plate 52 for conduction via a tube 76 of relatively larger diameter which leads to the dispenser 12 for input in selected manner.

Referring again to FIG. 1, a preferred form of input places metered dust insecticide from tube 76 directly into the comminutor 22 near the bottom of hopper 18. Thus, the dust flow tube 76 may be connected for input through a pipe 78 into the comminutor portion of the hopper 18 lower portion. An alternative input is shown by hose 76*a* as insecticide is input through a tube 80 directly upward from the bottom of hopper 18 into the comminutor 22. Still another alternative form of dust insecticide input utilizes a cylindrical connector 82 interconnecting outlet conduit 30 and applicator hose 16 and having a smaller diameter input tube 84 disposed at an acute angle to the axis of flow. The output dust hose 76*b* may then be connected to input tube 84 and the dust insecticide mixes with the bulk insulation as it progresses along the applicator hose 16.

In operation, bulk insulation is input via hopper 18 for break-up by comminutor 22 whereupon air under pressure from centrifugal blower 24 picks up and carries the bulk insulation via output conduit 30 at a pressure on the order of three to five pounds per square inch. The output conduit 30 and the applicator hose 16, a flexible reinforced hose, have a diameter of three to four inches. Such equipment as utilized for deposition of bulk insulation is well-known.

A selected form of dust insecticide is then input to hopper 34 for continuous deposition downward into the metering housing 38. A preferred insecticide that is particularly applicable in the method and highly effective in the elimination of cockroaches is an extermination grade boric acid dust. The boric acid, due to its particularly crystalline structure, has a stacking tendency and is difficult to maintain in downward flow into the drop slot 44 of metering housing 38. Therefore, suitable agitators 36 as may be motor-driven (not shown) in rotation or vibration tend to continually free the boric acid or other insecticide to maintain downward flow. The motor 60 is then set to a rotary speed which moves the successive metering compartments 64 through the air flow between inlet tube 72 and outlet tube 74 so that the desired amount of dust per unit time is being delivered upward along tube 76 for input and mixture with the bulk insulation in hopper 18. The air compressor 68 provides air input via tube 70 at about forty pounds per square inch to pickup the dust insecticide for traverse under pressure along the tube 76. Variation of speed adjust 62 results in greater or lesser concentrations per unit time of dust insecticide delivered for mixture with the bulk insulation prior to being expelled along applicator hose 16.

The foregoing discloses a novel method and apparatus for simultaneous deposition of bulk insulation and long-lasting pesticide. The present method provides an extremely safe and effective cockroach eliminator, especially when the bulk insulation is blown in combination with an exterminator grade boric acid; however, the dust insecticide may be a mixture of any selected pesticide powders, constituents of the mixture being selected for eradication of particular vermin, especially as may be indigenous to certain climates or areas of the country.

Changes may be made in combination and arrangement of elements or steps as heretofore set forth in this specification and shown in the drawings; it being understood that changes may be made in the embodiments disclosed without departing from the spirit and scope of the invention as defined in the following claims.

What is claimed is:

1. Apparatus for applying bulk insulation combined with insecticide in the void spaces of a building structure, comprising:

first hopper means receiving and continually agitating a quantity of bulk insulation;

second hopper means containing a supply of insecticide;

rotary metering means receiving insecticide from said second hopper means and continually isolating selected incremental amounts per unit time;

air pressure means conducting said incremental amounts of insecticide for input into combination with said agitating bulk insulation; and pneumatic means for transporting said combined bulk insulation and insecticide from said first hopper means to an operator position for placement in the void spaces.

2. A apparatus as set forth in claim 1 wherein:

said insecticide is a blatticide powder.

3. A apparatus as set forth in claim 2 wherein:

said blatticide consists largely of boric acid.

4. Apparatus for application of bulk insulation combined with insecticide into void spaces of a building structure, comprising:

hopper means receiving and comminuting bulk insulation;

second hopper means receiving a selected insecticide;

metering means receiving insecticide from the second hopper and isolating a measured amount adjacent an outlet port;

conduit means connecting from said outlet port to said hopper means;

an air source moving said insecticide measured amount through the outlet port and conduit means into the hopper means;

an air source directing air at increased pressure through said hopper means to move comminuted bulk insulation and insecticide toward a hopper outlet; and an applicator hose connected to receive combined bulk insulation and insecticide under air pressure for transport to said void spaces.

* * * * *